United States Patent [19]
Tam et al.

[11] 3,789,735
[45] Feb. 5, 1974

[54] DIVERTER VALVE MEANS FOR PRESSURE DIFFERENTIALLY OPERATED SERVOMOTOR

[75] Inventors: George M. Tam; Delbert J. Gardner; Frederick G. Grabb; James B. Putt; Carl D. Owens; William C. Sisco, all of South Bend, Ind.

[73] Assignee: The Bendix Corporation, South Bend, Ind.

[22] Filed: Feb. 15, 1973

[21] Appl. No.: 332,857

[52] U.S. Cl............ 91/1, 137/625.61, 137/625.65, 91/5, 91/47, 60/307
[51] Int. Cl...................... F01b 31/12, F15b 21/00
[58] Field of Search... 91/1, 5, 6, 47; 60/328, 307

[56] References Cited
UNITED STATES PATENTS
3,434,388   3/1969   Julow et al................................. 91/6
1,103,037   7/1914   Clark......................................... 91/29

*Primary Examiner*—Martin P. Schwadron
*Assistant Examiner*—A. M. Zupcic
*Attorney, Agent, or Firm*—Leo H. McCormick, Jr.; William N. Antonis

[57] ABSTRACT

A diverter valve for use in a vehicle having a power braking system operated by a pressure differential servomotor. The diverter valve directs air under pressure from an emission control pump to the servomotor in response to a signal generated upon actuation of the brake pedal to supply a first fluid under pressure which in conjunction with a second fluid creates the desired pressure differential in the servomotor.

10 Claims, 1 Drawing Figure

PATENTED FEB 5 1974
3,789,735
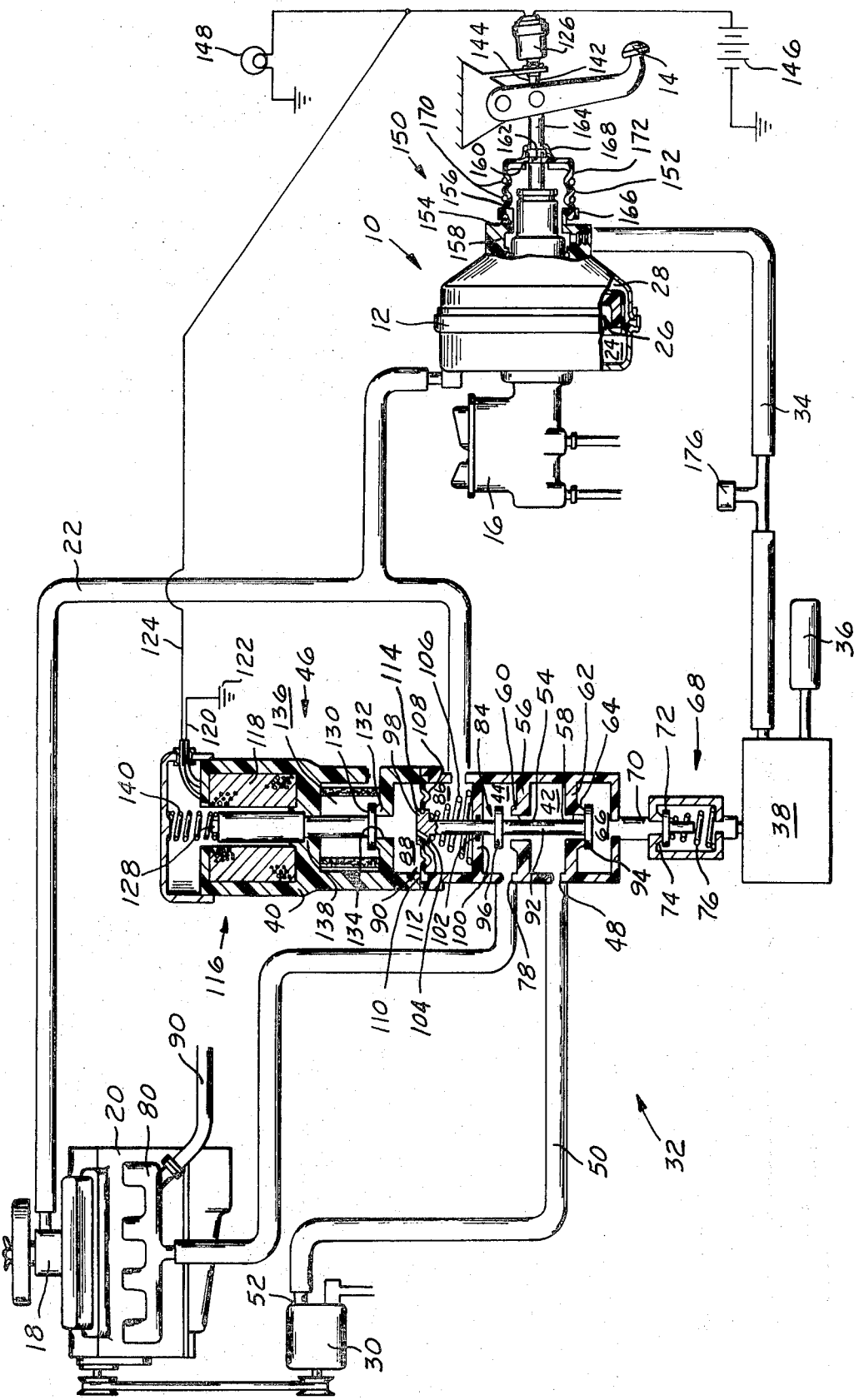

3,789,735

DIVERTER VALVE MEANS FOR PRESSURE DIFFERENTIALLY OPERATED SERVOMOTOR

BACKGROUND OF THE INVENTION

Passenger cars and light trucks in recent years have been provided with a servomotor to provide a power assist during braking. These servomotors have been operated by the pressure differential developed between vacuum produced at the intake manifold and air at atmospheric pressure. However, increases in the weight of many cars, disc brakes, and Government regulations with respect to emission controls have increased the operational force requirement of the servomotor.

In addition, new United States Government Standards require a reduction in the amount of pollutants which may be discharged into the air. As a result various systems have been devised to reduce the pollutants such as catalytic reactors and recirculating devices. In the recirculating devices a portion of the exhaust gases are directed into the intake manifold causing the vacuum level therein to be reduced with respect to the atmosphere. Thus, a larger size servomotor will be required to provide the same operational output force in vehicles so equipped.

Still further, new Department of Transportation regulations have reduced the stopping distances which are acceptable for various speeds. This regulation, in addition to affecting the manufacture of tires and brakes, also necessitates the need for a larger servomotor to perform more work in a shorter time period.

However, the available space under the hood of most vehicles will not permit a servomotor larger than is currently used to be easily installed without redesign of both the servomotor and mounting area in the vehicle.

In copending U.S. Application Ser. No. 332,971 filed Feb. 15, 1973 assignee of this invention and incorporated herein by reference, an automatically controlled diverter valve means is adapted to supply a servomotor system with air above atmospheric pressure to operate a power braking system.

We have devised a diverter valve means for directing air under pressure, which is presently supplied to the emission control apparatus on a vehicle, to a modified servomotor in a braking system. This air under pressure is adapted to create a pressure differential with the vacuum developed at the manifold to operate the modified servomotor and provide the power to operate the wheel brakes.

The air pressure is developed by a positive displacement pump and is generally available during deceleration since the engines in most vehicles do not require this air during the total deceleration time. Therefore, diversion of the air flow during deceleration will not affect the emission level. Thus, this air under pressure is communicated through a conduit to the housing of the servomotor and is immediately available to be admitted to the rear chamber of the servomotor upon movement of a control valve by an operator.

It is therefore the object of this invention to provide a power braking system with means for utilizing the output from an air pump to raise the pressure differential across a movable wall in a servomotor to produce a corresponding increase in the output therefrom.

It is another object of this invention to provide a diverter valve means for a power braking system to direct air under pressure to a servomotor in response to an electrical signal activating an electrical control.

It is still a further object of this invention to provide a diverter valve means with a storage chamber for retaining a sufficient quantity of a first fluid for developing a pressure differential with a second fluid to operate a servomotor in response to an operator command.

It is still a further object of this invention to provide a diverter valve means with storage means having a fluid limiter to maintain an operational pressure differential within a predetermined value.

These and other objects will become apparent from reading this specification and viewing the drawing.

BRIEF DESCRIPTION OF THE DRAWING

The drawing schematically illustrates a power braking system having a diverter valve means operated by an electrical control in response to a signal developed upon actuation of a servomotor by an operator. The diverter valve means will direct air under pressure into the servomotor and create a pressure differential across a movable wall contained therein with vacuum produced by the engine to energize a master cylinder to provide the power to operate the wheel brakes of the vehicle.

DETAILED DESCRIPTION OF THE EMBODIMENT

The power braking system 10 shown in the drawing has a servomotor 12 which is responsive to an input from an operator supplied through brake pedal 14 for energizing the master cylinder 16 to supply the wheel brakes of a vehicle with a pressurized fluid to operate the individual wheel brakes and bring the vehicle to a stop.

The servomotor 12 is operated by movement of a wall 26 contained therein through the pressure differential developed between vacuum developed at the intake manifold 18 of engine 20 and communicated through conduit 22 to the front chamber 24 and air above atomspheric pressure in the rear chamber 28 communicated from an air pump 30 through conduit 34 by diverter valve means 32. This operational pressure differential can be varied by a relief valve means 36 which will limit the amount of air under pressure retained in the storage chamber 38. Thus, the output from the servomotor 12 can be altered to meet vehicles of varying weight and still be effective in meeting stopping distances as set forth in Department of Transportation Safety Standards.

In more particular detail, the diverter valve means 32 consists of a housing 40 having an inlet chamber 42, an outlet chamber 44, and a control chamber means 46. The inlet chamber 42 has an entrance port 48 connected by conduit 50 to the output 52 of the air pump 30. The inlet chamber 42 has a first outlet port 54 in a wall 56 separating the inlet chamber 42 from the outlet chamber 44 and a second outlet port 58 in wall 62. The wall 56 has a seat 60 surrounding the first outlet port 54 while wall 62 has a seat 64 surrounding the second outlet port 58. The outlet port 58 is communicated through transition chamber 66 to a check valve 68 in the storage chamber 38 by conduit 70. A poppet 72 of the check valve 68 is held against a seat 74 by a spring 76 to prevent back flow of fluid out of the storage chamber 38.

The control chamber 46 is divided into a sensing chamber 86 and a power chamber 88 by a wall means 90. The wall means 90 is attached to a piston means 84 to direct the flow of air under pressure from the air pump 30 in response to a control pressure differential between the sensing chamber 86 and the power chamber 88. The air under pressure permitted to be communicated into the outlet chamber 44 will flow through an outlet port 78 into conduit 82. The conduit 82 will normally be connected to the exhaust manifold 80 to operate an emission control apparatus 90 or equally any other air operated device.

The piston means 84 includes a shaft 92 with a first poppet 94 in the transition chamber 66 adjacent the valve seat 64, a second poppet 96 located in the outlet chamber 44 adjacent the valve seat 60 and a plate 98 to which wall means 90 is attached. The shaft 92 is slidably carried by bearing wall 100 which separates the sensing chamber 86 from the outlet chamber 44. A seal 102 surrounds shaft 92 to prevent the vacuum communicated to the sensing chamber 86 from the intake manifold 18 from evacuating air out of the outlet chamber 44.

The plate 98 has a restricted passage 104 located therein to equalize the fluid pressure in the power chamber 88 and sensing chamber 86 and permit spring 106 to urge the first poppet toward valve seat 64 after a predetermined time delay.

The wall means 90 includes a diaphragm 108 with an outer periphery 110 secured to the housing 40 and an inner periphery 112 which snaps into a groove 114 in the plate 98. The diaphragm 108 will allow the shaft 92 to move the first poppet 94 away from valve seat 64 and engage the second poppet 96 on valve seat 60 to direct the air flow from pump 30 into the storage chamber 38 in response to an operational signal generated from energization of electronic control means 116.

The electronic control means 116 includes an annular coil 118 having a first lead 120 connected to ground 122 and a second lead 124 connected to the brake light actuation switch 126. A plunger 128 surrounded by the coil 118 has a poppet 130 on one end thereof which is located adjacent a valve seat 132. The valve seat 132 surrounds an opening 134 which connects the power chamber 88 with an atomspheric chamber 136. The plunger 128 is aligned within the annular coil by bearing wall 138 and maintained in an off center position by spring 140. The spring 140 is sufficiently strong to initially urge poppet 130 onto seat 132. As the vacuum in the sensing chamber 86 evacuates the power chamber 88, a holding pressure differential will be developed across the poppet 130 with air at atmospheric pressure in the atompsheric chamber 136.

MODE OF OPERATION OF THE PREFERRED EMBODIMENT

When the operator of the vehicle is driving, the air pump 30 will supply a sufficient volume of air under pressure to adequately operate the emission controls apparatus 90.

When the operator desires to stop the vehicle, upon lifting his foot from the accelerator pedal (not shown) the engine vacuum will be intensified sharply. This change in vacuum will be communicated to the sensing chamber 86 through conduit 22 and will simultaneously create an initial pressure differential across wall means 90. If this initial pressure differential is sufficient to overcome spring 106, piston means 96 will be moved to direct the air flow from pump 30 into the transition chamber. However, if this initial pressure differential is not sufficient to overcome spring 106, the piston means 96 will remain stationary at this time.

When the operator moves brake pedal 14 and face 142 away from contact 144, switch 126 will be actuated. With switch 126 activated, an electrical signal from battery 146 will simultaneously energize the stoplight 148 and the coil 118 of the electronic control means 116. With coil 118 energized, a magnetic field will be set up which will move plunger 128 in opposition to spring 140. Upon movement of plunger 128, the poppet 130 will be moved off valve seat 132 allowing air at atmospheric pressure to enter the power chamber 88 from the atomspheric chamber 136. With air at atmospheric pressure in the power chamber 88 and vacuum in the sensing chamber 86, a control pressure differential will be created which will move the first poppet 94 off the seat 64 and the second poppet 96 onto seat 60 to direct the output from the air pump 30 past check valve 68 into the storage chamber 38. The relief valve 36, connected to the storage chamber 38 will limit the pressure of the air therein, normally at between 8-12 pounds per square inch.

This air under pressure in the storage chamber 38 will be communicated through conduit 34 to bellows means 150. The bellows means 150 has a cylindrical body 152 with a first rib 154 positioned in groove 156 of the rear shell extension 158 and a second rib 160 positioned in a groove 162 of push rod 164. A first retainer ring 166 surrounds the external periphery of the first rib 154 to provide an air tight seal with the rear shell while a second retainer ring 168 surrounds the external periphery of the second rib 160 to form an air tight seal with the push rod 164. A plurality of rings 170 are located in the convolutions 172 to prevent the air under pressure from ballooning the bellows means 150. Now upon sufficient movement of the push rod 164 to activate the operational valve (not shown) in the servomotor 12, air under pressure will flow into the rear chamber 28 and create an operational pressure differential across the wall means 26 with vacuum in the front chamber 24. This operational pressure differential will approximately double the output force capabilities of the servomotor 12 and thereby provide a sufficient energizing force to the master cylinder 16 to operate the wheel brake within the standards set forth in the Department of Transportation Standards.

Upon termination of the input force on pedal 14, the electrical signal operating the coil 118 is correspondingly terminated. Thus, spring 140 will again urge poppet 130 onto seat 132 and allow vacuum in the sensing chamber 86 to evacuate air from the power chamber through passage 104 to eliminate the control pressure differential across wall means 90. When the control pressure differential has been sufficiently reduced, spring 106 will move piston means 84 to position poppet 96 off of seat 60 and poppet 94 onto seat 64. Now the air supply from pump 30 is again routed to operate the emission control means 90.

In the event that the pump 30 is not operational, a vent valve means 176 is located in conduit 34 to allow air at atmospheric pressure to enter into the bellows means 150 and provide an operational pressure differential with vacuum in the servomotor 12 during braking.

Further in the event that the vacuum supply to the front chamber 24 is interrupted, the air under pressure supplied to the rear chamber 28 will create a pressure differential across wall means 26 with air at atmospheric pressure to activate the master cylinder 16. Thus, we have provided the braking system with a back-up source of emergency power in the event of a malfunction in the primary operational mode.

Since a braking application will not normally occur with each change in the vacuum level at the intake manifold 18, "spikes" in vacuum level indicating changes in the amount of air needed by the emission controls device 90 are compensated through the movement of the piston means 84 by a control pressure differential across wall 90 directing any excess air into the storage chamber 38. The size of the restricted passage 104 is chosen to aid in a smooth operating emission control apparatus 90.

Thus, we have described how our diverter valve means 32 when used in conjunction with an air pump 30 can effectively provide the operational power needed to energize a servomotor 12 to produce an increased output to a activate a master cylinder 16 during periods of braking.

We claim:

1. A diverter valve means for use in a power braking system for directing a first fluid under pressure from a source to a servomotor in response to an actuation input, said servomotor being powered by an operational pressure differential created between the first fluid and a second fluid, said diverter valve means comprising:
   a housing having an inlet chamber, an outlet chamber and a control chamber, said inlet chamber being connected to the first source of fluid, said housing having a first wall separating the inlet chamber from the outlet chamber, said first wall having an opening therein communicating the inlet chamber from the outlet chamber, said inlet chamber being connected to said servomotor, said outlet chamber being connected to a device operated by said first fluid;
   movable wall means separating said control chamber into a sensing chamber and a power chamber, said sensing chamber being in communication with said second fluid, said sensing chamber being connected to said power chamber by a passage to establish an equilibrium between the sensing chamber and the power chamber;
   piston means attached to said movable wall means preventing communication between said inlet chamber and said servomotor; and
   control means responsive to a signal developed upon initiating said actuation input for allowing air to enter said power chamber and develop a control pressure differential across said wall means with said second fluid, said control pressure differential moving said piston means to interrupt communication between said inlet chamber and said outlet chamber and allow the first fluid to be communicated to the servomotor for developing said operational pressure differential.

2. The diverter valve means, as recited in claim 1, wherein said piston means includes:
   a stem attached to said movable wall means and extending through said outlet chamber into the inlet chamber;
   first poppet means attached to said stem for controlling communication between said inlet chamber and said outlet chamber;
   second poppet means attached to said stem for controlling communication between said inlet chamber and said servomotor; and
   resilient means associated with said stem for urging said second poppet means against a seat to allow the first fluid to be communicated between the inlet and outlet chambers.

3. The diverter valve means, as recited in claim 2 wherein said movable wall means includes:
   a plate secured to said stem having an orifice therein to form said passage; and
   a diaphragm having an outer periphery secured to said housing and an inner periphery secured to said plate, said diaphragm being flexible to move the stem in response to said control pressure differential.

4. The diverter valve means, as recited in claim 3, wherein said control means includes:
   solenoid means having a plunger which overlies and seals an opening in said power chamber, said solenoid being simultaneously energized by an electrical signal which activates a stoplight on a vehicle to move the plunger away from the opening and allow air to enter the power chamber to develop said control differential.

5. The diverter valve means, as recited in claim 4, wherein said housing further includes:
   a storage chamber connected to said inlet chamber for retaining a predetermined quantity of said first fluid to assure an operational supply for said first servomotor.

6. The diverter valve means, as recited in claim 5, wherein said housing further includes:
   check valve means located between said inlet chamber and said storage chamber to prevent backflow of said first fluid therebetween; and
   relief valve means connected to said storage chamber for limiting the quantity of said first fluid in the storage chamber.

7. The diverter valve means, as recited in claim 6, wherein said housing further includes:
   vent valve means connected to said storage chamber for allowing air to be communicated to said servomotor in the absence of said first fluid to develop said operational pressure differential with said second fluid.

8. The diverter valve means, as recited in claim 7, wherein said diverter valve means further includes:
   conduit means connected to said housing for communicating said storage chamber with the servomotor.

9. The diverter valve means, as recited in claim 8, wherein said conduit means includes:
   bellows means surrounding a push rod through which said actuation input is transmitted to the servomotor for preventing the first fluid from escaping into the atmosphere.

10. The diverter valve means, as recited in claim 9, wherein said bellows means includes:
    a cylindrical body having an outer periphery with a first rib thereon on one end and an inner periphery with a second rib thereon on the other end, said first rib being positioned in a first groove in a projection on the servomotor, said second rib being positioned in a second groove on said push rod;
    first clamp means surrounding said first end for retaining the first rib in the first groove;
    second clamp means surrounding said second end for retaining the second rib in the second groove; and
    a series of retainer means spaced on said cylindrical body to prevent said first fluid from radially expanding the same.

* * * * *